N. H. HASSEL.
PLANT PROTECTOR.
APPLICATION FILED MAY 31, 1921.
1,423,659. Patented July 25, 1922.
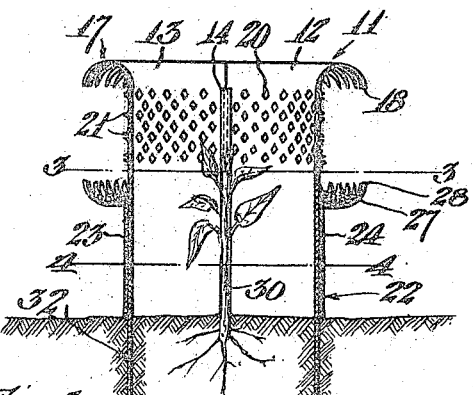
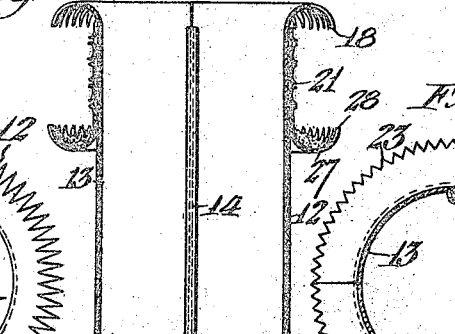
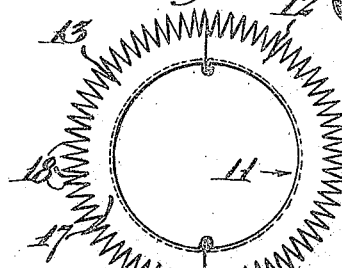
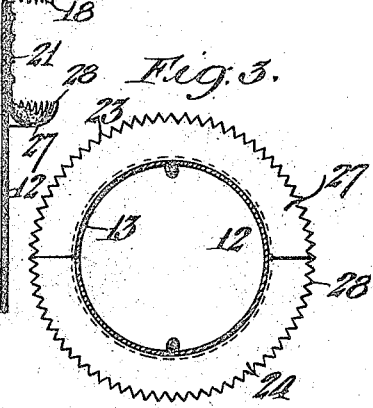
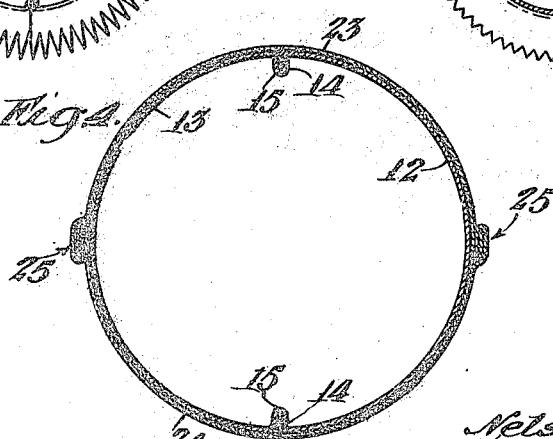
Inventor
Nels H. Hassel
by Graham & Harris
Attorneys

UNITED STATES PATENT OFFICE.

NELS H. HASSEL, OF LOS ANGELES, CALIFORNIA.

PLANT PROTECTOR.

1,423,659.  Specification of Letters Patent.  Patented July 25, 1922.

Application filed May 31, 1921. Serial No. 473,588.

*To all whom it may concern:*

Be it known that I, NELS H. HASSEL, a citizen of the United States, residing at Los Angeles, in the county of Los Angeles and State of California, have invented a new and useful Plant Protector, of which the following is a specification.

My invention relates to plant protectors, being more particularly a protective device designed to be placed around a small plant, such device being of sufficient size to permit unrestricted growth of the plant and of such character that the same may be used over and over again.

Certain forms of animal life are particularly destructive to growing plants, and one of the principal objects of my invention is to make a device of the character described which will prevent snails, worms and the like from getting on the plant during its early stage of growth.

Referring to the drawings, which are for illustrative purposes only,

Fig. 1 is a vertical sectional view of a device embodying a form of my invention showing the same as used in protecting a small plant.

Fig. 2 is a plan view of the device shown in Fig. 1.

Fig. 3 is a sectional plan view on line 3—3, Fig. 1.

Fig. 4 is an enlarged sectional plan view on line 4—4, Fig. 1, and

Fig. 5 is a vertical sectional view of a modified form of my invention.

The protector consists of a circular casing or pipe section of sheet metal open at each end, such pipe section being made in two halves 12 and 13, the vertical edges of the section 12 being bent inwardly as indicated at 14 to engage guides 15 formed on the adjacent vertical edges of the section 13, in such manner as to form a joint between the two halves of the casing permitting, however, a sliding movement of one part on another. The upper ends of the sections 12 and 13 are flared outwardly and downwardly, as indicated at 17, forming a circular flange, the edge of which is cut to form a series of sharp teeth 18. The sections 12 and 13 below such flange are punched to form a plurality of openings 20, being punched outwardly to form a series of sharp projections or spurs indicated at 21.

Placed about the casing 11 is a circular sleeve 22 which is also formed of two halves 23 and 24, the vertical edges of such sections being bent to form a seamed joint indicated at 25, the engagement of the edges in such joint being such as to permit a sliding movement of one half of the sleeve on the other half. The upper end of the sleeve 22 is bent outwardly to form a cupped shaped annular flange 27, such flange forming a circular cup, the outer edge of which is cut or serrated to form a plurality of sharp teeth 28.

The protector, just described, is used for protecting small plants until they have started their growth, the casing being placed about the plant 30 as shown in Fig. 1 with the lower end of the casing extending into the ground indicated at 32. Salt, Paris green, lime or any other material that is poisonous to worms, snails and similar plant destroying animals is placed in the cup 27. The protector entirely surrounds the plant, the only access to the plant for snails and the like is by climbing the outside of the protector, the first obstacle being the teeth 28 on the cup. If the snail should be able to cross the teeth, the next obstacle is the poisonous material in the cup. the next obstacle is the sharp projections 21, and, if the snail should be successful in passing such projections, the outward and downward extending sharp teeth provide a final obstacle to the entrance of the snail or worm to the inside of the protector.

After the plant has grown sufficiently, the protector is removed by sliding either half 12 or 13 on the other, the joints between the two halves permitting such sliding movement, and, when one half has been disconnected from the other half, it will be readily understood that the other half may be easily removed. It will be understood that the sleeve may be then similarly removed, that is, by sliding one half free of the other half.

In the form shown in Fig. 5, the cup indicated at 27 is formed on the lower end of the sleeve indicated at 22 in which case the perforations 20 are formed in the sleeve instead of in the casing proper.

While I have shown and described the protector as having the sleeve placed thereabout, as shown in the drawings, it is to be understood that the protector may be used without the sleeve, in which case the path of the snail or worm is interrupted by the perforations 21 in the casing 11 and the teeth 18.

It will be understood that a protector made as shown and above described permits cultivation and watering of the plant and that the poisonous material in the cup is conserved.

A further advantage in using the protector is that the small plants are protected from the wind.

I claim as my invention:

1. A plant protector comprising a circular casing open at each end, said casing being formed of two parts slidably connected; an outwardly and downwardly extending circular flange on the upper end of said casing; a series of teeth formed on the edge of said flange; a series of spurs formed on said casing under said flange; a circular sleeve on said casing formed of two parts slidably connected; an annular cup formed on the upper end of said sleeve; and a series of teeth formed in the edge of said cup.

2. A plant protector comprising a circular casing open at each end, said casing being formed of two parts slidably connected; a circular flange formed on the upper end of said casing having a toothed edge, a circular sleeve slidably mounted on said casing; and an annular cup formed on said sleeve.

3. A plant protector comprising a circular casing open at each end, said casing being formed of two halves slidably connected; a circular flange formed on the upper end of said casing; a series of teeth formed on the edge of said flange; and a series of spurs on said casing below said flange.

4. A plant protector comprising a circular casing open at each end; said casing being formed of two halves slidably connected, a flange formed on the upper end of said casing and a series of teeth formed on the edge of said flange.

In testimony whereof, I have hereunto set my hand at Los Angeles, California, this 20th day of May, 1921.

NELS H. HASSEL.